United States Patent [19]

Remondi

[11] Patent Number: 5,442,363

[45] Date of Patent: Aug. 15, 1995

[54] KINEMATIC GLOBAL POSITIONING SYSTEM OF AN ON-THE-FLY APPARATUS FOR CENTIMETER-LEVEL POSITIONING FOR STATIC OR MOVING APPLICATIONS

[75] Inventor: Benjamin W. Remondi, Dickerson, Md.

[73] Assignee: U.S. Army Corps of Engineers as represented by the Secretary of the Army, Washington, D.C.

[21] Appl. No.: 285,680

[22] Filed: Aug. 4, 1994

[51] Int. Cl.⁶ .......................... H04B 7/185; G01S 5/02
[52] U.S. Cl. ..................................... 342/357; 455/12.1
[58] Field of Search ......................... 342/357; 455/12.1

[56] References Cited

U.S. PATENT DOCUMENTS

| | | | |
|---|---|---|---|
| 5,072,227 | 12/1991 | Hatch | 342/357 |
| 5,148,179 | 9/1992 | Allison | 342/357 |
| 5,177,489 | 1/1993 | Hatch | 342/357 |
| 5,296,861 | 3/1994 | Knight | 342/357 |
| 5,359,332 | 10/1994 | Allison et al. | 342/357 |

OTHER PUBLICATIONS

Remondi, B., "Kinematic GPS Results W/O Static Initialization" NOAA Tech, Memo.NOS NGS-55, May 1991, pp. 1-25.
Remondi, B., "On-the-Fly Kinematic GPS Results Using Full-Wavelength Dual-Frequency Carrier Ranges", 49th Meeting of Inst. of Nav. Jun. 1993.
Remondi, B., "Real-Time CM-Accuracy GPS:Initialization While in Motion (Warm Start Vs. Cold Start)", Navigation, vol. 40, No. 2, Summer 93, pp. 199–207.

Primary Examiner—Theodore M. Blum
Attorney, Agent, or Firm—Luther A. Marsh

[57] ABSTRACT

The invention provides a method and apparatus for determining the precise coordinate of a remote roving on-the-fly signal receiver with respect to a reference signal receiver. The reference signal receiver is usually fixed to the Earth's surface but the instant invention's method allows for movement of the reference signal receiver without performance degradation. The reference receiver and remote roving receiver track four or more satellites so that single difference code and carrier ranges between the receivers can be formed. The method can work with just L1 signal alone, the preferred method uses at least one code range (e.g., C/A code) and two carrier ranges (e.g., L1 and L2) with full wavelength L2—squared implementation addition code ranges if available for use. This method allows for initialization of carrier integer ambiguities whether reference or remote receiver are fixed or moving relative to each other and a robust procedure for determining integer ambiguities.

30 Claims, 3 Drawing Sheets

KINEMATIC GLOBAL POSITIONING SYSTEM OF AN ON-THE-FLY APPARATUS FOR CENTIMETER-LEVEL POSITIONING FOR STATIC OR MOVING APPLICATIONS

STATEMENT OF GOVERNMENT INTEREST

The invention described herein may be manufactured and used by or for the Government of the United States of America for governmental purposes without the payment of any royalties thereon.

FIELD OF THE INVENTION

This invention relates generally to positioning systems using signals broadcast from multiple earth orbiting satellites and in particular to satellite based differential positioning systems that determine the position coordinates of one receiver, referred to as a remote roving receiver, relative to the known position of another, referred to as the reference receiver which may be stationary or moving in an on-the-fly (OTF) mode of operation.

BACKGROUND OF THE INVENTION

The DoD has been deploying Global Positioning System (GPS) satellites for military and civil use beginning in 1978. Today, there are 25 GPS satellites approximately uniformly spaced around the earth. From any earth location one expects to be able to track typically five to seven GPS satellites at any given time. In fact there are times when 10 or more satellites can be tracked simultaneously. These satellites broadcast signals on two frequencies L1 and L2. L1 and L2 are, respectively 154 and 120 times the basic clock frequency of 10.23 MHz. The L1 and L2 carrier signals can be tracked by a GPS receiver providing few-millimeter-precision "carrier" ranges between the receiver and satellite. By multiplying the carrier by +1 or −1 at precise points in the signal stream, the GPS satellite produces a coded signal which a GPS receiver expects. The code ranges have precision in the range of 1 decimeter to a few meters (depending on receiver hardware) but are effectively unambiguous; the carrier ranges have few-millimeter precision but are ambiguous. The strengths of code and carrier ranges need to be combined for this apparatus to achieve both accuracy and robustness.

When a user deploys two GPS receivers, it is possible to achieve centimeter accuracy in a relative sense between the two receivers. Typically one receiver is a fixed reference receiver and the second is at a fixed unknown site or is in motion and its instantaneous position (i.e., unknown) is desired with centimeter accuracy in three dimensions (e.g., North, East, Up). Typical hardware for the implementation of the instant invention's method is shown and described in prior U.S. Pat. No. 5,177,489 to Hatch entitled "Pseudolite-Aided Method for Precision Kinematic Positioning" and U.S. Pat. No. 5,148,179 to Allison entitled "Differential Position Determination Using Satellites" which are hereby incorporated by reference.

Prior references that deal with precise (i.e., centimeter-level) positions that can be sequentially determined based on carrier phase kinematic positioning methods is taught in U.S. Dept. of Commerce NOAA Technical Memorandum NOS NGS-55, May 1991 by Benjamin W. Remondi entitled "Kinematic GPS Results Without Static Initialization." This reference teaches of an approximate initial positioning by meter-level differential GPS solutions that is used in the instant invention, but does not sufficiently teach or suggest the method and apparatus herein.

U.S. Pat. No. 5,177,489 to Hatch discloses a method for precision kinematic positioning of a remote receiver using a ground based psuedolite in addition to orbital satellites wherein measurements from a minimum of satellites are used to determine an initial set of potential solutions to the portion of the remote receivers antenna. Redundant measurements from additional satellites are then used to progressively reduce the number of potential solutions to close to one. Limitations of this patent include: (1) the need for a psuedolite as part of the system hardware which isn't required by the instant invention where a minimum of four satellites is all that is required to make fast and precise measurements; (2) the technique used in this patent cannot deal with many high speed real-time applications, whereas the instant invention's technique is more robust in eliminating false potential locations in a grid due to the fact that the required satellite carrier signal data input to the remote roving and reference signal receivers in any required epoch is shorter due to the fewer number of satellites required and no redundant satellites are required for precise location measurements; (3) the technique used in this patent cannot resolve carrier ambiguities solely with four GPS satellites or with a combination of GPS satellites and pseudolites which add to four whereas the instant invention can; (4) the technique used in this patent depends upon a wide lane which is defined as the difference in the L1 and L2 carrier measurements forming L1–L2 whereas the instant invention does not require this feature and creates a greater signal utilization by forming independent L1 and L2 grids for potential solutions of the location; (5) the method of forming four parallel planes to create the set of grid point candidates can be a limiting factor when any configuration of four satellites has high positional dilution of precision (PDOP) whereas the instant invention herein uses a method called Ambiguity Resolution Using Trial Position (ARUTP) which makes for a more robust method; (6) the patent has limited range as to distance between the remote roving and reference receivers due to the fact of using psuedolite(s) which are located on the earth whereas the instant invention uses at least four satellites that are above the earth at any time and (7) the patent requires continuous L2 carrier phase data for a dual frequency method whereas the instant invention requires only fractional phase for L2.

U.S. Pat. No. 5,148,179 to Allison discloses another method for precision kinematic positioning of a remote receiver using only orbital satellites which are at least four in number wherein psuedorange double differences are formed, between each of the two receivers and each of a first satellite and the other three satellites derived from the either of the two signal frequencies. Limitations of this patent include: (1) the technique used in this patent depends upon a wide lane formed by the difference in L1 and L2 carrier measurements forming L1–L2 whereas the instant invention does not require this feature and creates a greater signal utilization by forming an L1 and L2 grid; and (2) the technique used in this patent can initialize carrier integer ambiguities based on only four satellites if the initial differential GPS determination achieves better than half a wide lane whereas the instant invention does not require this limitation in a situation where only four satellites are present.

U.S. Pat. No. 5,296,861 to Knight entitled "Method and Apparatus For Maximum Likelihood Estimation Direct Integer Search In Differential Carrier Phase Attitude Determination Systems" discloses a statistical method for rapid resolution of integer ambiguities in measured GPS carrier phase data. Limitations of this patent include it being an attitude system requiring a priori knowledge of the distance from the reference receiver to the remote receiver which requires that the distance between reference and remote receiving antennas be extremely small whereas the instant invention allows for much greater distances.

Accordingly, there is still need for improvement in this field to provide a method and apparatus that i) reduces the time needed to eliminate false position solutions in the carrier phase ambiguity resolution of GPS signals, ii) increases the operating range between the remote and reference receiving antenna, iii) reduces the number of false initializations, and iv) minimizes the number of satellites required in the initialization phase while still allowing for initialization of a moving remote receiver.

OBJECTS AND SUMMARY OF THE INVENTION

The invention provides a method for use in a global positioning system comprising hardware and software that converts measurements taken from two GPS receivers into centimeter-level-accuracy positions in either real-time or post-processed mode. A very important aspect of the invention is its' real time capabilities where carrier integer ambiguities can be initialized for a moving OTF platform applications, i.e. a remote roving receiver, without ever having to stop. For static applications, the method can be used identically. The invention requires, as a minimum, measurements of the code and carrier on at least the L1 GPS signal (i.e., both code and carrier ranges). The invention performs significantly better if the L1 code and carrier observations are accompanied by codeless L2-squared carrier ranges.

The invention performs substantially superior to L2-squared when the L1 code and carrier are augmented with either codeless or P code full-wavelength L2 carrier ranges. The invention performs at its best when the full suite of independent GPS observable are available (i.e., full-wavelength L1 and L2 carrier ranges plus independent L1 and L2 code ranges, whether P code or not). The carrier measurements can be accomplished with only four satellites to make measurements from.

Within the method, both the reference receiver and the remote receiver can be moving or fixed, in any combination with respect to the earth's surface. For improved performance, the invention permits the imposition of a priori constraints such that fewer satellites are required for the initialization period.

DETAILED DESCRIPTION

The method of the instant invention uses computer hardware, software and the required radio signal transmission and receiving equipment to resolve carrier range integer ambiguities of doubly differenced GPS carrier phase measurements. It does so in the same fashion whether the remote GPS receiver is in motion or not. The instant invention's method can also have the reference receiver be in motion. This ambiguity resolution is required to generate unambiguous and precise carrier range measurements from GPS receivers to GPS satellites. In fact this ambiguity resolution is fundamentally what allows the invention to deliver centimeter-level-accuracy positioning.

Figure 1:
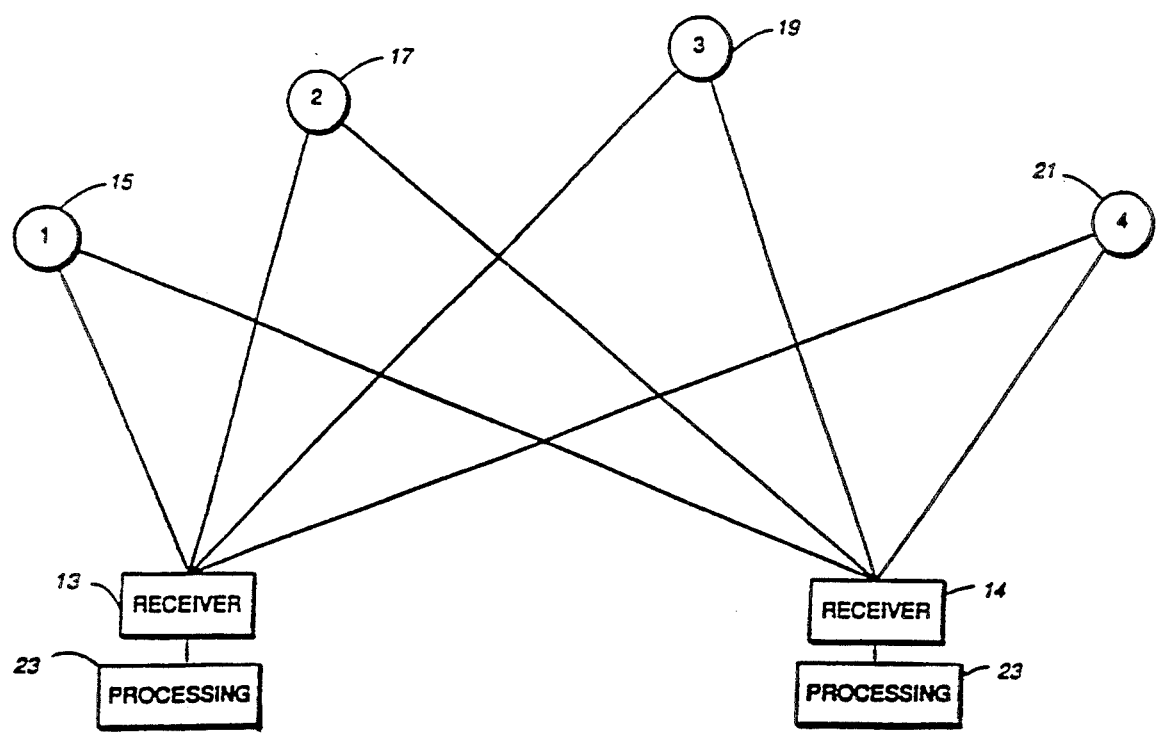
FIG. 1 is a schematic diagram illustrating a differential positioning system utilizing four or more earth orbiting satellites, a reference receiver and a remote roving receiver according to the invention.

FIG. 1 shows the preferred embodiment of the apparatus that allows for accurate determination of one or more receivers relative to a reference receiver, using radio signals received from several satellite of four or greater in number. No constraints are imposed upon the movement of the receivers which may be moving relative to one another. In the most basic form, the apparatus has only two GPS receivers 13 and 14 as shown. One of these receivers 14 is designated as the reference receivers, and is usually stationary or has a known position. However, their is no constraint that the reference receiver 14 be non-moving. The other receiver 13, designated as the moving remote receiver is usually in motion with respect to the reference receiver 14. However, there is no constraint that the remote roving receiver must be in motion The invention's method can be expanded to include multiple reference and moving receivers. Each of the receivers 13 and 14 can receive carrier signals from four or more transmitting satellites 15, 17, 19 and 21 which are required for total freedom of motion type applications. If additional constraints are imposed upon the moving remote receiver 13 such as a geometric constraint which reduces the number of degrees of freedom by one, then three or more satellites may be used as discussed below. The measurements can be used to determine centimeter-level-accuracy positions in either real-time or post processed mode by processor(s) 23.

Once these integer ambiguities are resolved, precise (i.e., centimeter-level) positions are sequentially determined based on carrier phase kinematic positioning methods well known in the art as discussed in U.S. Dept. of Commerce NOAA Technical Memorandum NOS NGS-55, May 1991 by Benjamin W. Remondi entitled "Kinematic GPS Results Without Static Initialization." As an intermediate product the apparatus provides meter-level differential GPS position outputs.

The method determines the relative position of a remote GPS receiver/antenna with respect to the location of a reference GPS receiver/antenna. GPS code and carrier range measurements made by both the reference and the remote receivers are used in the ambiguity resolution process. After the lane ambiguities are resolved, only double differenced carrier phase measurements are used in the computation of the precise (i,e., centimeter level) positions. Both carrier measurements and code measurements are used to determine meter-level-accuracy positions.

Although the invention's method can use just L1 code and carrier and has been demonstrated using L1 code and carrier plus codeless L2-squared carrier measurements, the preferred observation set for the invention is full-wavelength L1 and L2 carrier ranges and at least one code range (usually L1 C/A code). Improved performance is achieved with additional code ranges. For simplicity the ambiguity resolution step will be described assuming only these three observation types. In practice more observation types can be used when available. Additionally, lane resolution using single frequency can be used by the invention's method, L2-squared and full-wavelength L2 modes are the modes preferred in the current realization of the invention.

The four major steps the invention performs are: (1) the meter-level differential GPS initial approximate solution, (2) establishing the grid for candidates, (3) the resolution of the carrier range integer ambiguities, and (4) use the results of step (3) to provide continuous centimeter-level-accuracy positioning. Below, an overview of these steps is provided.

Approximate Initial Positioning by Meter-level Differential GPS (Initial Approximate Solution) Sections a-f; Steps 200-600 in FIG. 2a.

This method is well known in the art as taught in U.S. Dept. of Commerce NOAA Technical Memorandum NOS NGS-55, May 1991 by Benjamin W. Remondi entitled "Kinematic GPS Results Without Static Initialization."

a. Sequential code pseudoranges and carrier phases are measured by both receivers over a preselected time interval. The measurements are single differenced, for each satellite, between the reference and the remote receivers. If $R_i{}^j$ is a code psuedorange and $O_i{}^j$ is a carrier psuedorange for receivers i=1,2 of either the reference or remote receiver and satellite j and k is a satellite, then $R_{12}{}^j$ and $O_{12}{}^j$ are single-difference code and carrier pseudoranges between receiver 1 (the reference) and receiver 2 (the remote). These can be formed for frequencies L1, L2 or both L1 and L2.

b. An initial (reference) time epoch $t_o$ is chosen for the purpose of estimating the relative location of the remote antenna with respect to the reference antenna at the meter level. This same epoch will be used to attempt to resolve the carrier lane ambiguities later on. This epoch can be manually selected in post-processing mode and is auto selected in real-time mode. In addition a time span of data is selected which may begin or end with $t_o$ or $t_o$ may be anywhere within the time span of the interval.

c. One-frequency, single difference code ranges over the selected time interval are mapped to the reference epoch using corresponding L1, single difference, carrier phase delta ranges; A delta range is the difference between the continuous carrier phase measured at the present time epoch and that at the reference epoch. Typically, the L1 C/A code is used but this is not a restriction. In fact, currently the apparatus can operate with either L1 or L2 or the average of L1 and L2 code ranges. The mapping function is:

$$[R_{12}{}^{jk}(t_{526})]_i = R_{12}{}^{jk}(t_i) - \lambda[O^{12jk}(t_i) - O_{12}{}^{jk}(t_o)] \quad (1)$$

where the subscript 1 represents the reference receiver and 2 represents the rover receiver, $t_i$ is the epoch time of the code measurement to be mapped and $t_o$ is the reference time to which the measurement is mapped and $\lambda$ is the wavelength. Also this equation is valid for L1 or L2 code ranges.

d. The mapped, single-difference, code ranges, accumulated over the time interval, are averaged to produce one-single-difference code range per satellite at the reference epoch $t_o$. This is given by the equation:

$$\overline{R}_{12}{}^{jk}(t_o) = 1/N \ (\Sigma[R_{12}{}^{jk}(t_o)]_i) \quad (2)$$

where N is defined as the number of code ranges mapped to $t_o$, and i is the is the shorthand for $t_i$.

e. The approximate (few decimeter to meter-level) relative position of the remote antenna at the reference epoch is computed from these averaged, single-difference code ranges at $t_o$. This is a standard weighted least square procedure with four or more equations at $t_o$ and four unknowns: $x_2(t_o)$, $y_2(t_o)$, $z_2(t_o)$ and $\Delta t_2(t_o)$. These are the remote roving receiver's positions and clock positions relative to the reference at time $t_o$.

f. A search volume is established about this approximate remote antenna location at the reference epoch $t_o$. The dimensions of the volume may be preselected or established from the covariance information of the approximate position solution. Volumes are typically selected as rectangular parallelepipeds, cylinders, ellipsoids of revolution, or triaxial ellipsoids; the latter is most common. A typical search volume is an ellipsoid whose major axis is oriented vertically to the ellipsoid of the earth and whose major axis is roughly 1.5 to 2.0 times the minor axis.

Figure 2A:
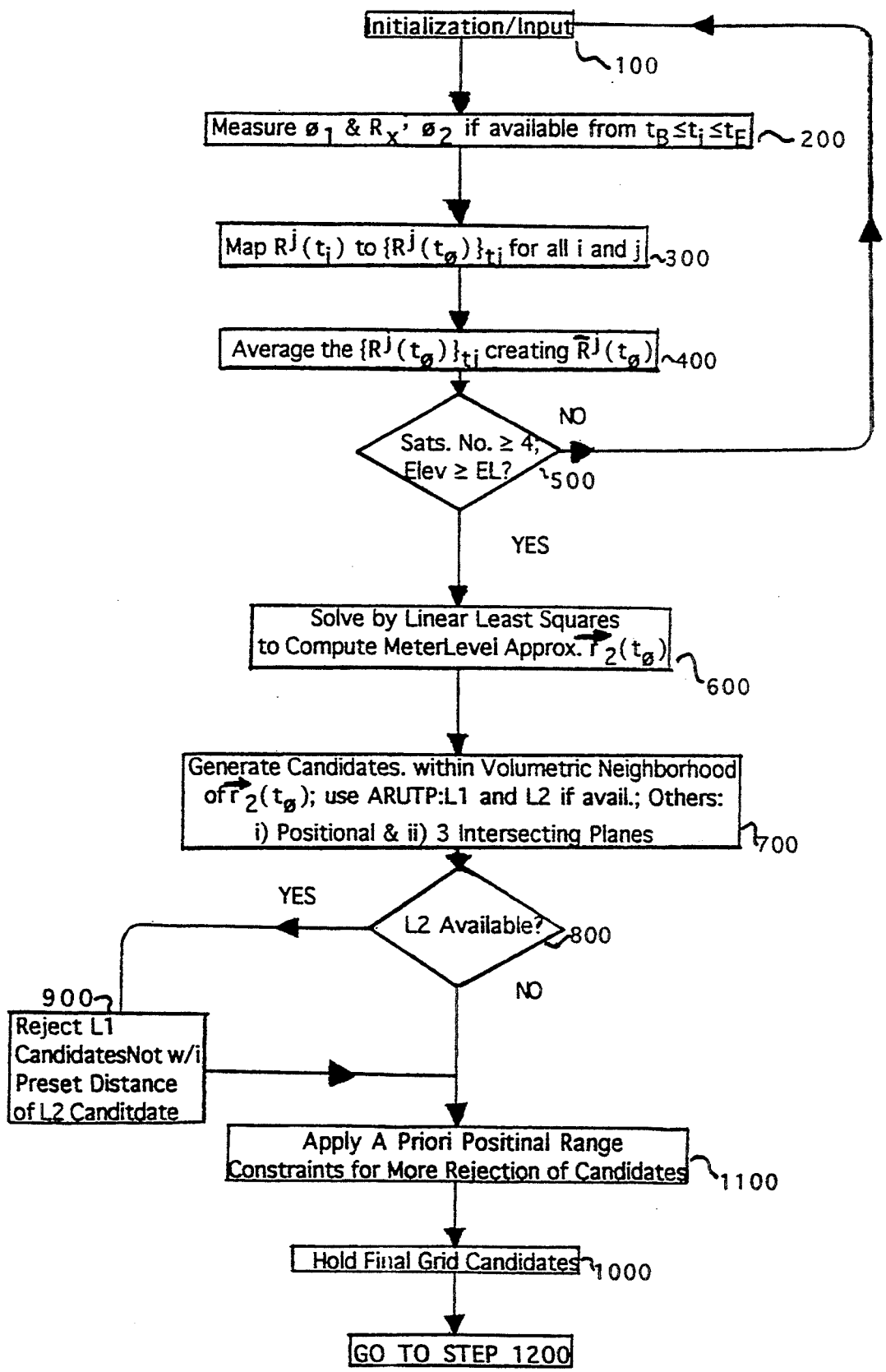
FIG. 2a is part of the overall flow chart for the method that illustrate the initialization phase of the remote receiving antenna with respect to the reference receiving antenna.

Establishing Grid Candidates: Sections g-i; Steps 700-1000 in FIG. 2a.

g. L1 carrier phase measurements from the at least four satellites at the reference epoch are used to establish a set of candidate initial positions within the search volume. The candidate positions are at the intersection of three double difference carrier phase lane planes. This step is taught by Hatch's U.S. Pat. No. 5,177,489 for L1 only. However, the preferred method is to use the full carrier phase measurements L1 and L2 where L2 carrier phase measurements additionally is obtained from the at least four satellites at the reference epoch to establish an additional set of candidate initial positions within the search volume. This step produces the L1 and L2 sets of candidate grid points. This step requires continuous L1 carrier observations but only fractional L2 carrier observations; continuous L2 carrier observations can be used if available.

h. The candidate initial positions in the L1 and L2 sets are compared for closeness to each other. When an L1 and L2 grid position are acceptably near, the L1 grid position is retained for later evaluation. Any positional candidate outside the defined search volume is rejected. This rejection of candidates is not equivalent to the wide lane methodology required of candidates selected by the difference between L1 and L2 full carrier phase measurements.

i. The method of generating trial positions described in sections g. and h. above, is optional and there are other implemented options. For one, a simple positional grid can be used. This is shown in Grid Candidate within the volumetric neighborhood (step 700 as shown in FIG. 2a). All the observations are compared with the computed trajectory initialized at each grid point where L1 and L2 carrier integers are established at each time point along the trajectory. A more efficient method which can be used in step 700 of FIG. 2a is the Ambiguity Resolution Using Trial Positions (ARUTP) which is discussed below. With ARUTP an L1 positional grid (e.g. 15 cm) is first generated. Each grid position is used to resolve the L1 double difference carrier ambiguity for each satellite pair. After establishing the L1 integer ambiguity for each double difference observation a least-squares procedure is performed to determine the trial position which best fits these ambiguity-resolved carrier ranges. For L2 this process may be repeated or the resulting updated L1 grid point (as described above) may be used to resolve L2 integers yielding, after least squares, an updated L2 grid point. Finally, the updated L1 grid point will be retained if it is close (e.g., within 5 cm) to the updated L2 grid point.

Triple Difference Evaluation Technique for Resolution of the Carrier Range Integer Ambiguities Sections j-k; Steps 1200-2000 of FIG. 2b.

j. Using all available carrier phase data, from all available satellites, L1 and L2 error statistics are calculated for all the retained candidate solutions over the selected time interval. Only 4 satellites are required to carry out this procedure but additional satellites are used if available for redundancy using a triple difference technique.

The trajectory points over the sorted interval are computed using a least squares technique. These $t_i$ trajectory positions are converted to ranges to satellites and compared to the data to find the best match and score sufficiently well. Computed ranges minus carrier ranges (modulo one cycle) get a perfect score of 1.0 for an exact match and 0.0 score for complete inconsistency (i.e., 0.5). Between these extremes is a linear scale. A final candidate scores are a ratio of what was achieved divided by what was maximally possible.

k. The error statistics for the remaining candidate positions are reduced to four quantities for each candidate. They reflect how well candidates yield ambiguities which are close to integers and the smallness of residuals for the ionospherically-free linear combination of carrier ranges. This permits candidates to be rank ordered. If the residual errors of the top candidate are sufficiently low, if the integer nature of the candidate is sufficiently high, and if there is sufficiently large differentiation between the top and second candidate, then the top candidate is accepted as the right candidate along with its associated integer ambiguities. If the top candidate is not sufficiently differentiated from the other candidates, reprocessing after modifying initial parameters may be decisive. E.g., selecting a different reference time within the same interval of observations, selecting a different set of satellites or making justified different assumptions regarding the search volume or grid provide alternative reprocessing scenarios.) Otherwise, the process is restarted from the beginning for a different reference epoch and interval.

BEST MODE

Figure 2B:
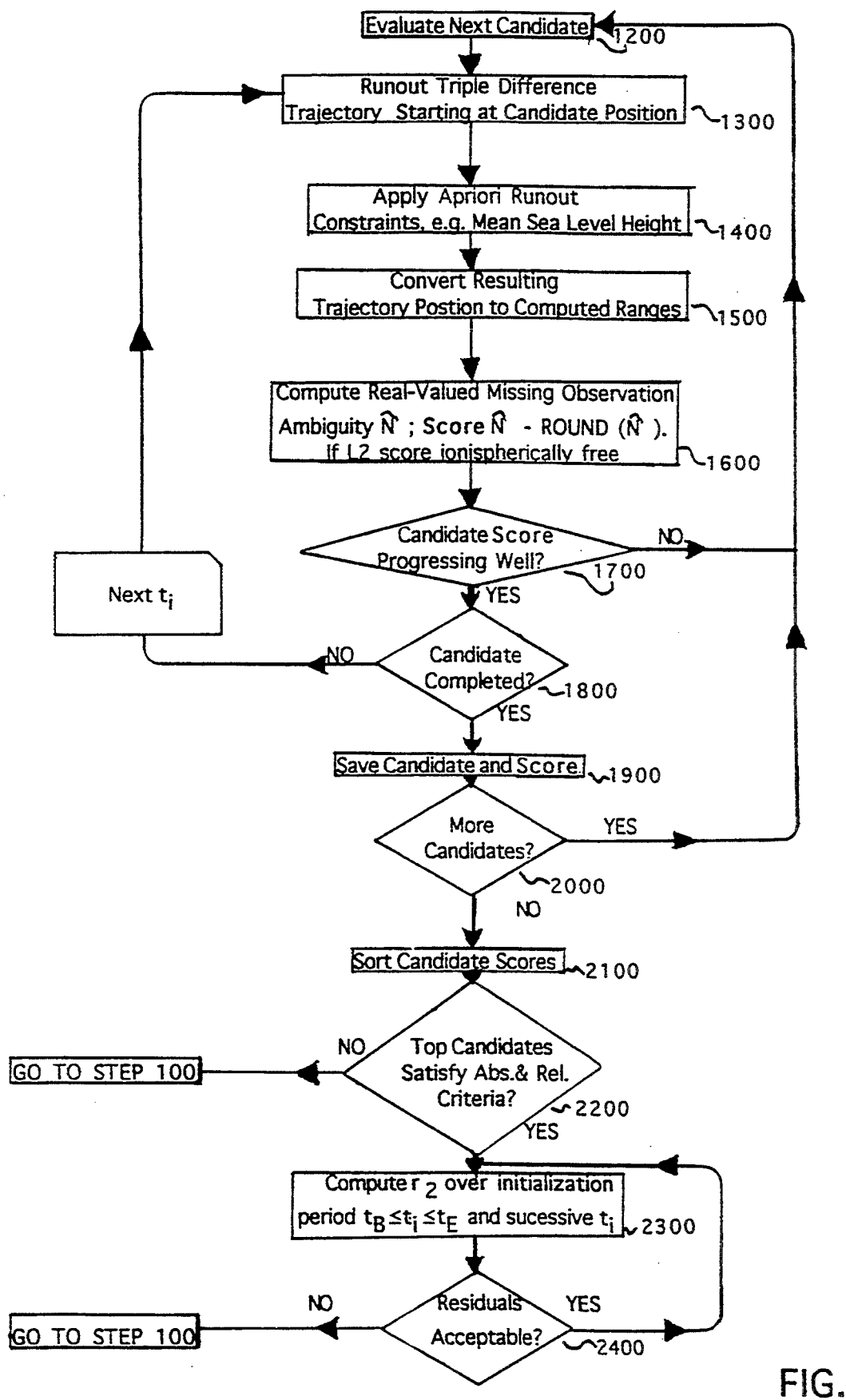
FIG. 2b is a continuation of FIG. 2a that additionally shows the continuous kinematic positioning phase of the method.

In FIG. 2a and 2b, the method starts at Initialize/Inputs, step 100, where input is automatic or manual. In the Measuring Input, step 200, an interval from beginning time $t_B$ to ending time $t_E$ is defined. Reference time $t_o$ is within the closed interval. In a minimum configuration, there is a single frequency receiver with ambiguous L1 carrier ranges $o_1{}^j$ and unambiguous and unambiguous code ranges $R_1{}^j$ for each satellite j. In the preferred embodiment there are L1 and L2 carrier ranges $o_1{}^j$ and $o_2{}^j$, where $o_2{}^j$ can be squared but is preferred not to be squared; any code ranges $R_x{}^j$, where $R_x$ represents any $R_{C/A}$, $R_{P1}$ or $R_{P2}$ multiple code ranges can be used to improve performance. Only the fractional phase portion of $o_2{}^j$ is required. The Mapping step 300 is single difference code data at $t_i$ is formed as:

$$R^j(t_i) = R_2{}^j(t_i) - R_1{}^j(t_i) \qquad (3)$$

are formed where $R_2$ represents the remote code range and $R_1$ represents the reference code range. Likewise, the single difference carrier data at is formed as:

$$O^j(t_i) = O_2{}^j(t^i) - O_1{}^j(t_i) \qquad (4)$$

Data at time $t_i$ can be mapped to time $t_o$ as follows:

$$R^j(t_o) = R^j(t_i) - \lambda[O^j(t_i) - O^j(t_o)] \qquad (5)$$

where $\lambda$ is the wavelength.

In the Averaging step 400, the mapped quantities are averaged for each satellite over the set of relevant recording epochs. The notation $\{R^j(t_o)\}_{ti}$ indicates this is the $R^j(t_o)$ contribution which is mapped to $t_o$ from $t_i$. The Decision step 500 decides whether to discontinue the process when there are too few satellites. At least four satellites with the proper elevation greater than EL must exist to continue. In the Solving step 600, one single difference equation for each satellite is created. Step 600 uses standard linear least squares methodology to determine the remote receiver position and clock with respect to the reference receiver. This results in a meter position determination for the remote receiver. Also, step 600 uses statistical uncertainty values which are computed for defining a search volume within which the remote receiver is located. This volume can be part of the input optionally. In the Grid Point Candidate Generation, step 700, ARUTP is the preferred method where unambiguous carrier ranges for all the satellites are generated based on a fixed positional grid. As an example, a 15-cm xyz grid is generated and at each of these grid points, all ambiguities are resolved. These resolved carrier ranges generate an adjusted grid point for L1 which can subsequently be used to do likewise for L2 if L2 is available. The results of this procedure yields a candidate grid point which will later be evaluated, (step 1200 below). This procedure is carried out throughout the entire search volume. Additionally, other less efficient methods can be used such as grid point generation by either a i) a positional grid candidate generation method or ii) a three intersecting plane generation method. In the Decision step 800 of whether L2 is available for generating the grid candidates, the process can proceed with a single frequency receiver, but the preferred embodiment includes L2. Conditional processing step 900 is used for L2 only, which eliminates the grid candidate at this early stage should the L1 ARUTP grid point disagree with the L2 ARUTP grid point more than epsilon (a prescribed difference). The Saving step 1000 saves the remaining grid candidates for later evaluation. A priori Geometrical Constraint step 1100, allows for more rejection of grid candidates by applying additional geometric constraints to the search volume. For example, this can be range constraints as determined from other instruments; height constraints from other instruments; range constraints from resolved ambiguities carried over from a prior initialization. These constraints reduce the search volume and allows for the elimination of grid candidates which are within the eliminated portion of the search volume. The Evaluation Beginning step 1200 begins the evaluation loop to determine which grid candidate appears to be "best". The Runout Triple Difference Trajectory processing method, step 1300, uses the xyz of the grid candidates which is assumed to be correct at $t_o$. This allows the computation of the remote receiver at time $t_i$ based upon the triple difference methodology which is:

$$\rho_{12}^{jk}(t_i) - \rho_{12}^{jk}(t_o) = \lambda[O_{12}^{jk}(t_i) - O_{12}^{jk}(t_o)] \quad (6)$$

where $\rho$ is the computed range and hides the unknowns at $t_i$ (i.e. $\rho(t_i) \equiv \rho(x_2(t_i), y_2(t_i), z_2(t_i))$. The subscripts, 12 represents the remote and reference receivers and the superscripts, jk, represents the two satellites. This is a triple difference equation and is the difference of two double difference equations:

$$\lambda[O_{12}^{jk}(t_i) + N_{12}^{jk}] = \rho_{12}^{jk}(t_i) \quad (7)$$

with three or more such triple difference equations, the positional unknowns $x_2(t_i), y_2(t_i), z_2(t_i)$ can be computed. In the A priori Runout Constraints processing step 1400, xyz at each $t_i$ can be converted to latitude, longitude and height and the height can be averaged as to location and rate of change. Grid point candidates can be rejected if the computed averages disagrees with the a priori constraint. With this knowledge of the remote receivers position at each $t_i$, the double difference carrier ranges can be computed at each $t_i$ as indicated in the Convert Resulting Trajectory Position to Computed Ranges in step 1500.a priori information of an average height and rate of change of height of the remote receiving antenna to further eliminate an examined grid point during the triple difference evaluation technique.

In Compute step 1600, for each grid candidate, at each time $t_i$, $x_2(t_i), y_2(t_i), z_2(t_i)$ can be converted to a real-value ambiguity value $\widetilde{NN}_{12}^{jk}$ according to:

$$\widetilde{NN}_{12}^{jk} = \{[\rho_{12}^{jk}(t_i)]/\lambda\} - O_{12}^{jk}(t_i) \quad (8)$$

where $\rho$ is the computed double difference ranges and $\underline{O}$ is the corresponding observation. Within step 1600, $\widetilde{N}$−ROUND ($\widetilde{N}$) is a measure of how well the data agrees with the candidate computed range at $t_i$ for this double difference pair (i.e., j,k). The function ROUND rounds $\widetilde{N}$ to the nearest integer. This quantity is computed for $N_1$ and $N_2$ if available. Given the $N_1$ and $N_2$, the ionospherically free linear combination can ultimately be computed at $t_i$. If $\widetilde{N}$=ROUND ($\widetilde{N}$), this candidate receives a score increment of 1.0. If $\widetilde{N}$−ROUND ($\widetilde{N}$)=0.5, a score increment of 0.0 is achieved. In between a linear assignment is made in the scoring from 0.0 is achieved. In between a linear assignment is made in the scoring from 0.0 (disagreement) to 1.0 (agreement). In Decision step 1700, a candidate may be rejected early if after its' scoring is averaging below a set threshold after a certain selected number of epochs. This threshold may linearly diminish optionally, to accelerate rejections, after that minimum number of epochs have been processed. Decision step 1800 tests whether all epochs for this candidate have been processed. If so, the candidate and its' score are stored for later analysis as shown as Save step 1900. Decision step 2000 is the test on whether all candidates have been processed. In Sort step 2100, all candidates which have passed are ordered based on score. If both L1 and L2 are present, then the average of the L1 and L2 scores is used in the sort. In Ranking Decision step 2200, the score of the top candidate needs to exceed a certain value which is dependent upon the distance between the reference receiver and the remote receiver. This is an absolute score. Should the top score be less than the distance dependent value, the initialization could not be finalized and it would be restarted. Also within the step 2200, is the relative criterion. The top score must exceed the second score by a preselected or preestablished amount, e.g., 3% or 5%. If not, initialization is restarted at step 100. Thus, the initialization phase which comprises steps 100–2200 is completed.

If the values are acceptable absolute and relative scores at the Continuous Kinematic Positioning step 2300, initialization is complete and the centimeter accuracy position of the remote receiver is known at time $t_o$ and the double difference ambiguity integers $N_{12}^{jk}$ are all known. This permits the trajectory to be computed at all times within the initialization interval $t_B \leq t_i \leq t_E$ and other times not in the initialization interval. As the trajectory computation continues from epoch to epoch, a test of residuals (i.e. computed range minus observed ranges) is continuously checked. If these residuals deteriorate beyond a certain threshold, as indicated by Decision step 2400, then the process will be restarted at step 100. The steps 2300–2400 comprise the continuous kinematic positioning phase.

An additional aspect of this method and associated GPS system has to do with the application of additional constraints in the resolution of the integer ambiguities. The GPS system permits the imposition of a priori geometric constraint information to the integer resolution process. For a specific example, if one determines, by any means, including by use of the subject system, the mean ellipsoidal height and the rate of change of the mean ellipsoidal height of the antenna phase center while operating on a marine vessel, that average height knowledge can be applied in a later kinematic GPS OTF initialization. Any candidate solution which does not have the anticipated average height runout within the bounds of what the average height is known to be can be rejected. This capability can enhance the OTF initialization considerably.

This system can also exploit any geometric constraint information which limits where an antenna phase center is located at the time associated with the OTF initialization. This can include a priori knowledge of one or more double difference integer ambiguities, one or more ranges from given points in space, or a constraint on the path or location of the antenna phase center. For example, the location of the antenna phase center on a railroad track car which is restricted to what the tracks allow; there is only one degree of freedom, the minimum number of satellites required is two and a search region of grid candidates would be locations along the track line. Another example of an a priori constraint is when the remote antenna is at a functionally defined surface location with respect to the reference antenna. The minimum number of satellites required is three and the search region would be a location defined by the functionally defined surface.

This system can also exploit a priori range constraints which are a known location to the remote GPS receiver's antenna. The point of the known location could be the site of a ranging reflector (fixed) or it could be the reference GPS's receiver antenna. In the later case, the instant invention defaults to a direction determination mechanism which will yield attitude information, the minimum number of satellites required is three and the search region of grid candidates is the surface of a sphere.

Although the description above contains many specificities, these should not be construed as limiting the scope of this invention but as merely providing illustrations of some of the presently preferred embodiments of this invention.

I claim:

1. A method for determining a relative position of a remote receiving antenna with respect to a reference receiving antenna in a satellite-based positioning system under varying relative kinematic conditions between the remote and reference receiving antenna, the method comprising the steps of:

making carrier phase measurements based on the reception of a dual frequency carrier signals L1 and L2 over one or more epochs of an initialization time period from each of a plurality of at least four satellites used to compute the relative position of the remote receiving antenna;

deriving from the carrier phase measurements an initial set of potential solutions that are grid points for the relative position, wherein the initial set of potential solution grid points all are within a region of uncertainty defined by a search volume, and wherein multiple potential solution grid points arise because of whole cycle ambiguity of the carrier signals L1 and L2;

eliminating a first set of false solutions from the initial set of potential solutions leaving a reduced number of potential solution;

determining a final unique solution from the reduced number of potential solutions, by using a triple difference evaluation technique, the triple difference techniques is defined as:

iteratively evaluating the reduced number of potential solutions using a runout triple difference trajectory starting position of a grid point final candidate position using a least squares technique, converting a resulting runout triple difference trajectory position to computed ranges of each final candidate position, scoring the difference between the computed ranges of each final candidate position and carrier ranges with module one cycle, determining the final solution by applying error statistics to each final candidate that i) reflects a degree of coincidence of that final candidate's yield ambiguities to integer values and ii) a smallness of residuals for an ionospherically-free linear combination of carrier ranges.

2. A method as defined in claim 1, and further comprising the step of making redundant carrier phase measurements if available based on the reception of carrier signals from additional satellites and additional epochs; and eliminating false solutions from the set of potential solutions, based on a comparison of the additional carrier phase measurements with the initial set of potential solutions using the triple difference evaluation technique.

3. A method as defined in claim 1, and further comprising the step of creating initial L1 and L2 grid sets within the search volume;

the L1 and L2 grid sets are created independently of each other and not based upon wide lane grid sets defined by the difference of L1 and L2; and further eliminating potential solutions where L1 and L2 grid points differ in position by more than a threshold value.

4. A method as defined in claim 1, wherein the step of deriving the set of potential initial solutions includes locating points of intersection of both L1 and L2 planar carrier wave fronts defining possible locations of the secondary antenna within the region of uncertainty.

5. A method as defined in claim 4, wherein the step of deriving the set of potential initial solutions includes comparing L1 potential solutions and L2 potential solutions to arrive at a reduced set of potential solutions when L1 and L2 potential solution sets agree to a threshold value.

6. A method as defined in claim 1, wherein the step of deriving the set of potential initial solutions by use of a positional grid technique that includes locating grid points of intersection of x,y,z planes which is not restricted based on carrier wavefronts.

7. A method as defined in claim 1, wherein the step of deriving the set of potential initial solutions by use of an ambiguity resolution using trial position (ARUTP) technique that includes locating grid points of an L1 grid wherein each grid point is used to resolve an L1 double difference carrier ambiguity for each pair of the at least four satellites, then a least square technique is used to determine a trial position which best fits the L1 double difference carrier ambiguities for each pair of the at least four satellites which becomes an updated L1 grid point, then an updated L2 grid point is determined for defining possible locations of the remote receiver antenna within the region of uncertainty; and the step of eliminating false solutions includes comparing the updated L1 grid point with the updated L2 grid point and retaining each potential updated L1 grid point solution for which the updated L2 grid point is less than a selected threshold.

8. A method of claim 7 wherein the updated L2 grid point is generated from the updated L1 grid point by use of a least squares technique.

9. A method of claim 7 wherein the updated L2 grid point is determined by locating grid points of an L2 grid wherein each grid point is used to resolve an L2 double difference carrier ambiguity for each pair of the at least four satellites, then a least square technique is used to determine a trial position which best fits the L2 double difference carrier ambiguities for each pair of the at least four satellites.

10. A method of claim 1 wherein the method further comprises the initial step of determining an approximate initial relative position of the remote receiving antenna.

11. A method of claim 10 wherein the step of determining the approximate position includes making measurements of psuedorandom codes received from the satellites, and computing the approximate relative position from the code measurements.

12. A method as defined in claim 1, and further comprising a step of imposing a priori information of an average height and a rate of change of height of the remote receiving antenna to further eliminate grid points during the triple difference evaluation technique;

determining the average height of a grid candidates trajectory by the triple difference evaluation technique; and eliminating grid candidates when it exceeds the a priori information of the average height.

13. A method as defined in claim 1, wherein the step of making carrier phase measurements based on the reception of the dual frequency carrier signals L1 and L2 over one or more epochs of the initialization time period from each of the plurality of at least four satellites used, the L2 carrier signal used is only a fractional part of the L2 carrier signal.

14. A method as defined in claim 1, wherein the step of eliminating the first set of false solutions from the set of initial potential solutions using geometric volumetric restrictions for the search volume and a priori constraints.

15. A method as defined in claim 14, wherein the search volume is a cylinder.

16. A method as defined in claim 14, wherein the search volume is an ellipsoid.

17. A method as defined in claim 14, wherein the search volume is a rectangular parallelepipeds.

18. A method for determining the relative position of a remote receiving antenna with respect to a reference receiving antenna in a satellite-based positioning system under varying relative kinematic conditions between the remote and reference receiving antenna, the method comprising the steps of:

making carrier phase measurements based on the reception of a single frequency carrier signal L1 from each of a plurality of at least five satellites used to compute the relative position of the remote receiving antenna;

deriving from the carrier phase measurement an initial set of potential solutions that are grid points for the relative position, wherein the initial set of potential solution grid points all are within a region of uncertainty defined by a search volume, and wherein the set of potential initial solutions by use of an ambiguity resolution using trial position technique includes locating grid points of an L1 grid wherein each grid point is used to resolve an L1 double difference carrier ambiguity for each pair of the at least five satellites, next a least square technique is used to determine a trial position which best fits the L1 double difference carrier ambiguities for each pair of the at least five satellites which becomes an updated L1 grid point; and determining a final unique solution from the reduced number of potential solutions, by using a triple difference evaluation technique, the triple difference techniques is defined as:

iteratively evaluating the reduced number of potential solutions using a runout triple difference trajectory starting position of a grid point final candidate position using a least squares technique, converting a resulting runout triple difference trajectory position to computed ranges of each final candidate position, scoring the difference between the computed ranges of each final candidate position and carrier ranges with modulo one cycle, determining the final solution by applying error statistics to each final candidate that i) reflects a degree of coincidence of that final candidate's yield ambiguities to integer values and if) a smallness of residuals for an ionospherically-free linear combination of carrier ranges.

19. A method as defined in claim 18, and further comprising the step of making redundant carrier phase measurements based on the reception of a carrier signal from additional satellites and additional epochs; and eliminating false solutions from the set of potential solutions, based on a comparison of the additional carrier phase measurements with the initial set of potential solutions.

20. A method as defined in claim 18, wherein the step of deriving the set of potential initial solutions includes locating points of intersection planar carrier wave fronts defining possible locations of the secondary antenna within the region of uncertainty.

21. A method as defined in claim 18, wherein the step of deriving the set of potential initial solutions by use of a positional grid technique that includes locating grid points of intersection of x,y,z planes which is not restricted based on carrier wavefronts..

22. A method as defined in claim 18, wherein the step of deriving the set of potential initial solutions by use of an ambiguity resolution using trial position (ARUTP) technique that includes locating grid points of an L1 grid wherein each grid point is used to resolve an L1 double difference carrier ambiguity for each pair of the at least five satellites, then a least square technique is used to determine a trial position which best fits the L1 double difference carrier ambiguities for each pair of the at least five satellites which becomes an updated L1 grid point.

23. A method of claim 18 wherein the method further comprises the initial step of determining an approximate initial relative position of the remote receiving antenna.

24. A method of claim 23 wherein the step of determining the approximate position includes making measurements of psuedorandom codes received from the satellites, and computing the approximate relative position from the code measurements.

25. A method for determining the relative position of a remote receiving antenna with a reference receiving antenna in a satellite-based positioning system using a priori constraint information under varying relative kinematic conditions between the remote and reference receiving antenna, comprising the steps of:

making carrier phase measurements based on the reception of at least one frequency carrier signal comprising L1 and L2 from each of a plurality of at least one more satellite than the number of degrees of freedom (DOF) of the remote receiving antenna relative to the reference receiving antenna that are used to compute the relative position of the remote receiving antenna;

deriving from the carrier phase measurements an initial set of potential solutions that are grid points for the relative position, wherein the initial set of potential solution grid points all are within a region of uncertainty defined by a search region that is dependent on the DOF of the remote receiving antenna, and wherein multiple potential solution grid points arise because of whole cycle ambiguity of the at least one frequency carrier signal comprising L1 and L2;

eliminating false solutions from the initial set of potential solutions leaving a reduced number of potential solutions; and determining a final unique solution from the reduced number of potential solutions, by using a triple difference evaluation technique, the triple difference techniques is defined as:

iteratively evaluating the reduced number of potential solutions using a runout triple difference trajectory starting position of a grid point final candidate position using a least squares technique, converting a resulting runout triple difference trajectory position to computed ranges of each final candidate position, scoring the difference between the computed ranges of each final candidate position and carrier ranges with modulo one cycle, determining the final solution by applying error statistics to each final candidate that i) reflects a degree of coincidence of that final candidate's yield ambiguities to integer values and ii) a smallness of residuals for an ionospherically-free linear combination of carrier ranges.

26. A method of claim 25 wherein the a priori constraint information is that the distance between the remote receiver antenna and a reference position is known, the minimum number of satellites is three and the search region is a surface of a sphere.

27. A method of claim 26 wherein the known reference position is coincident with the reference receiver antenna whereby directional information of the remote receiving antenna is known with respect to the reference receiving antenna.

28. A method of claim 25 wherein the a priori constraint information is that the remote receiver antenna maintains a train-track type trajectory on the earth with respect to the reference receiving antenna, the minimum number of satellites is two and the search region is a location along the train-track type trajectory.

29. A method of claim 25 wherein the a priori constraint information is that the the remote receiver antenna is at a functionally defined surface location with respect to the reference receiving antenna, the minimum number of satellites is three and the search region is a location defined by the functionally defined surface.

30. A method as defined in claim 7, wherein the step of deriving the set of potential initial solutions includes comparing L1 potential solutions and L2 potential solutions to arrive at a reduced set of potential solutions when L1 and L2 potential solution sets agree to a threshold value.

* * * * *